UNITED STATES PATENT OFFICE.

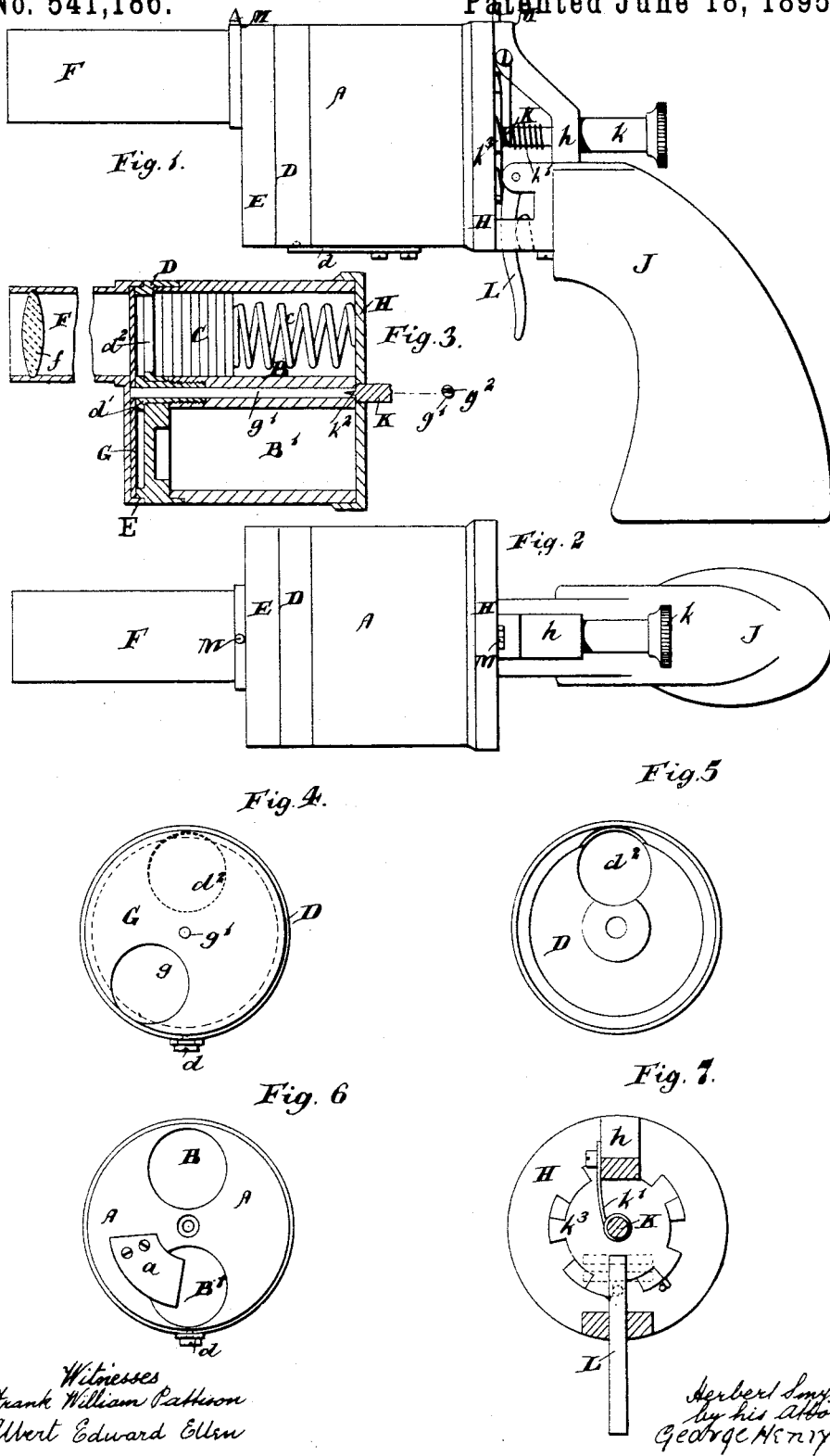

HERBERT SMYTH, OF LONDON, ENGLAND.

MAGAZINE-CAMERA.

SPECIFICATION forming part of Letters Patent No. 541,186, dated June 18, 1895.

Application filed October 6, 1894. Serial No. 525,129. (No model.)

*To all whom it may concern:*

Be it known that I, HERBERT SMYTH, a subject of the Queen of Great Britain and Ireland, residing at 123 Lancaster Road, Notting Hill, London, have invented certain new and useful Improvements in Photographic Cameras, of which the following is specification.

This invention relates to an improved photographic camera, and is intended to provide a pocket camera for taking instantaneous pictures, which can be directed to the objects more accurately than those commonly in use, and which can be more conveniently manipulated.

The camera is arranged so as to have an appearance similar to that of a revolver, and is pointed at the object to be taken in a similar manner, a trigger in the usual position at the front of the handle releasing the shutter and making the exposure.

In order that the invention may be clearly understood, reference is had to the accompanying sheet of drawings, in which—

Figure 1 is a side elevation, and Fig. 2 a plan, of the complete apparatus. Fig. 3 is a longitudinal section of the cylinder and caps Fig. 4 is a front view of the shutter and cap. Fig. 5 is a rear view of one of the caps. Fig. 6 is a front view of the cylinder, and Fig. 7 shows the rear cap with part of the mechanism in section.

A is the cylinder or body of the camera, having the cylindrical chambers B and B'. The sensitive plates or films C ready for use are placed in the upper chamber B, and are of disk shape fitting the bore closely, the lower chamber B' receiving the used up films. On the front of the cylinder the cap or disk D is fitted, capable of turning around the cylinder and held in position by the spring catch $d$ on the cylinder which engages with a small recess in the cap. The cap is fixed on the cylinder by the screw $d'$ bored centrally for the purpose hereinafter described. The cap is furnished with a hole $d^2$ a little smaller than the bore of the cylinder, and situated in a line with it, so that the front film will shut against it exposing the face. A spring $c$ is placed at the back of the films to push them to the front of the chamber. On turning the cap D the front film will be carried with it until it meets the wedge $a$ fixed on the face of the cylinder over the lower chamber B'. The face of this wedge and its edge bear against the face of the plate D, so that as the plate is turned, carrying the film which rests on its face, the edge of the wedge will when the film is reached, pass under the edge of the latter preventing its being carried farther round, and thus forcing it into the chamber B', the film sliding over the beveled part of the wedge. This wedge insures the film falling into the chamber where it is retained until removed for developing. The cap is turned a complete revolution, the catch showing when it has reached the proper position again.

On D a second cap E is fixed by screws or otherwise, so as to turn with it, the tube or barrel F carrying the lens $f$, being fitted to this cap.

A small space is left between the two caps to permit of the insertion of the disk shutter G. This shutter is provided with the exposure aperture $g$ and is carried on the end of the spindle $g'$ which passes through the screw $d'$ and the middle of the cylinder to the back. On the back of the cylinder a third cap H is fitted covering the chambers and carrying the shutter operating mechanism, with the handle J of pistol shape, by which the instrument is held when in use. The operating mechanism consists of a small spindle K carried by the frame $h$ and provided with the thumb piece $k$ and spring $k'$. This spindle engages with the shutter spindle $g'$ by means of a cross cut notch $g^2$ in the end of the latter, into which the wedge shaped end $k^2$ of the spindle K fits when the cap H is fitted in place. The end of this spindle with the cross cut notch is shown in the small view attached to Fig. 3, this view showing the spindle in end elevation. This enables the cap H and attached parts to be taken off for the removal of the plates C without interfering with the front part of the instrument. The spindle is furnished with the ratchet wheel $k^3$ retained in operative position by the trigger L which when pulled back in the ordinary manner will release the arm and permit it, with the spindles and shutter, to spring back to the position shown.

The instrument is aimed at the object in the same manner as a revolver is aimed, sights M being provided to enable it to be used more accurately.

The operation of the apparatus is as follows:—When the camera is being pointed at the object and before an exposure has been made the shutter G is in the position shown in Fig. 4, the aperture $g$ being some distance from $d^2$, the latter opening thus being completely closed, and the film shut off from the light. The ratchet wheel $k^3$ is turned into the corresponding position, as shown in the drawings, and is held by a trigger L. On pulling this trigger back the ratchet wheel is released, and owing to the spring $k'$ is rapidly revolved the greater part of one turn operating the disk shutter through the spindles K and $g'$. The aperture $g$ will thus pass over $d^2$ making a momentary exposure. After this has been done, the exposed plate, which is at the front, is removed by turning the front of the camera round a complete revolution, the caps D and E turning on the cylinder A. The cap D carries the front film round with it until the latter meets the wedge $a$, which detaches it, as above described, from the cap, and causes it to fall into the chamber B'.. At the end of the complete revolution of the caps, the next film will come into position ready for another exposure.

What I claim as my invention, and desire to secure by Letters Patent, is—

1. In a photographic camera, the combination with a cylinder having two tubular chambers holding the films, and a pistol shaped handle, of two perforated caps on the front of the said cylinder, adapted to turn and carry the exposed film from one chamber to the other, a disk shutter fixed on a spindle passing through the cylinder and a trigger releasing the said shutter, substantially as and for the purposes specified.

2. In a photographic camera, the combination with a cylinder having two tubular chambers, two caps on the said cylinder carrying the lens tube and capable of turning, a disk shutter between the caps, and a spindle carrying the shutter and passing through the cylinder, of a pistol shaped handle, a rear cap on the cylinder, a spindle engaging with the shutter spindle, spring and ratchet wheel on the said spindle and trigger retaining the ratchet wheel and serving to operate the exposure device, substantially as and for the purposes specified.

3. In a photographic camera, the combination with a cylinder having two tubular chambers, two caps on the said cylinder carrying the lens tube and adapted to turn, a disk shutter between the caps, and a spindle carrying the shutter on one end and formed with a notch at the other, of a pistol shaped handle a spindle with wedge shaped end engaging with the shutter spindle, a spring on the said spindle and a trigger releasing the exposure device, substantially as specified.

In witness whereof I have sworn to set my hand in presence of two witnesses.

HERBERT SMYTH.

Witnesses:
 FRANK WILLIAM PATTISON,
 ALBERT EDWARD ELLEN.